United States Patent [19]

Giles, Jr. et al.

[11] Patent Number: 4,587,295

[45] Date of Patent: May 6, 1986

[54] POLYCARBONATE COMPOSITION

[75] Inventors: Harold F. Giles, Jr., Cheshire; Robert P. Hirt, Jr., Lenox, both of Mass.

[73] Assignee: General Electric Company, Mt. Vernon, Ind.

[21] Appl. No.: 688,248

[22] Filed: Jan. 2, 1985

[51] Int. Cl.$^4$ ............................................ C08L 69/00
[52] U.S. Cl. .................................... 525/57; 525/60
[58] Field of Search ................... 525/57, 60, 67, 148, 525/146

[56] References Cited

U.S. PATENT DOCUMENTS

| | | | |
|---|---|---|---|
| 3,431,224 | 3/1969 | Goldblum | 525/453 |
| 3,585,177 | 6/1971 | Gardner et al. | 525/62 |
| 4,226,950 | 10/1980 | Holub | 525/148 |
| 4,263,201 | 4/1981 | Mark | 525/148 |
| 4,362,844 | 12/1982 | Lemstra et al. | 525/57 |
| 4,390,657 | 6/1983 | Liu | 525/148 |
| 4,496,693 | 1/1985 | Rosenquist et al. | 525/148 |

*Primary Examiner*—Veronica P. Hoke
*Attorney, Agent, or Firm*—Myron B. Kapustij; Martin B. Barancik

[57] ABSTRACT

Polycarbonate composition comprising, in physical admixture:
  (i) from about 10 to about 96 weight percent high molecular weight aromatic thermoplastic polycarbonate resin;
  (ii) from about 2 to about 35 weight percent of a olefin vinyl alcohol copolymer; and
  (iii) either from about 2 to about 35 weight percent of an olefin vinyl ester copolymer or from about 2 to about 90 weight percent of a polyolefin resin.

21 Claims, No Drawings

POLYCARBONATE COMPOSITION

BACKGROUND OF THE INVENTION

Aromatic polycarbonates are well known polymers having excellent impact resistance, toughness, heat resistance, and dimensional strength. However, the resistance of aromatic polycarbonates to various solvents is generally not as high as desired. Resistance to organic solvents, particularly to those of high aromatic content, is not exceptional and can be upgraded significantly. Of particular concern is the relatively poor resistance of aromatic polycarbonates to basic solvents such as those containing hydroxyl groups, basic alcohols, and amines. Basic substances are known to attack the carbonate bond, thereby forming oligomers out of the polycarbonate resin with a concomitant decrease in such properties as impact strength.

The admixing of aromatic polycarbonates with other polymers is generally done to upgrade properties of polycarbonates. Because of their great strength to weight ratio, as well as upgrading of other properties, aromatic polycarbonate admixtures have extended the application of aromatic polycarbonates to many potential fields, particularly automotive. Various upgrading of certain properties must be done to provide a polycarbonate composition suitable for various specific applications. For example, a part made for use in or near the engine compartment of an automotive vehicle should maintain good properties at high temperatures. Exposure to certain chemicals such as gasoline can be very significant for a bumper made of polycarbonate. Often, however, the improvement of one property by blending the polycarbonate with another plastic resin may not result in the improvement of another property, or may actually lower or adversely affect other properties. Furthermore, the blending of polycarbonate with certain other resins can bring about incompatibility problems as shown by surface delamination, poor weld line strength, excessive stress crazing or cracking, and the like.

It is an object of the instant invention to provide polycarbonate compositions exhibiting improved resistance to solvents and exhibiting good compatibility of the individual components of these compositions.

SUMMARY OF THE INVENTION

The instant invention is directed to polycarbonate compositions exhibiting improved resistance to solvents while simultaneously exhibiting good compatibility of the components of the multicomponent blends comprised of, in admixture:
(i) at least one high molecular weight aromatic polycarbonate resin;
(ii) at least one olefin vinyl alcohol copolymer; and
(iii) either a polyolefin resin or an olefin vinyl ester copolymer.

DESCRIPTION OF THE INVENTION

In accordance with the instant invention there is provided a novel multicomponent polycarbonate composition suitable for molding shaped parts exhibiting improved resistance to solvents comprised of, in physical admixture:
(i) at least one high molecular weight aromatic polycarbonate resin;
(ii) at least one olefin vinyl alcohol copolymer; and
(iii) either a polyolefin resin or an olefin vinyl ester copolymer.

The instant composition contains from 10 to about 96 weight percent of at least one high molecular weight aromatic polycarbonate resin; from about 2 to about 35 weight percent of at least one olefin vinyl alcohol copolymer; and from about 2 to about 35 weight percent olefin vinyl ester copolymer or from about 2 to about 90 weight percent olefin polymer. Preferably this composition contains from about 15 to about 90 weight percent polycarbonate; from about 3 to about 30 weight percent olefin vinyl alcohol copolymer; and from about 3 to about 30 weight percent olefin vinyl ester copolymer or from about 5 to about 85 weight percent olefin polymer. More preferably this composition contains from about 20 to about 85 weight percent polycarbonate; from about 5 to about 25 weight percent olefin vinyl alcohol copolymer; and from about 5 to about 25 weight percent olefin vinyl ester copolymer or from about 10 to about 80 weight percent polyolefin.

Aromatic polycarbonates are known materials which may be readily prepared by a variety of processes. A particularly useful process for the preparation of aromatic polycarbonates is the interfacial polymerization process in which a dihydric phenol is reacted with a carbonate precursor. These high molecular weight polycarbonates, along with methods for their preparation, are disclosed, inter alia, in U.S. Pat. Nos. 2,999,835, 3,028,365, 3,275,601, 3,334,154 and 3,989,672, all of which are hereby incorporated herein by reference. Typical of some of the dihydric phenols which may be employed in the preparation of the polycarbonates are 2,2-bis(4-hydroxyphenyl)propane (bisphenol-A), 1,1-bis(4-hydroxyphenyl)propane, 2,2-bis(4-hydroxyphenyl)pentane, 2,2-bis(2-methyl-4-hydroxyphenyl)propane, 2,2-bis(2,6-dimethyl-4-hydroxyphenyl)propane, 2,2-bis(2,6-dibromo-4-hydroxyphenyl)propane, 1,1-bis(4-hydroxyphenyl)cyclohexane, 1,3-bis(4-hydroxyphenyl)propane, 4,4'-thiodiphenol, bis(3,5-diisopropyl-4-hydroxyphenyl)sulfone, p,p'-dihydroxydiphenyl, and bis(4-hydroxyphenyl)ether. Other useful dihydric phenols are disclosed in U.S. Pat. Nos. 2,999,835, 3,028,365, 3,334,154, 3,035,021, 3,036,036, 3,036,037, 3,036,038 and 3,036,039.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the carbonate polymers of the instant invention. Also employed in the practice of this invention may be blends of any of the above materials to provide the aromatic carbonate polymer.

The carbonate precursor may be either a carbonyl halide, a carbonate ester or a bishaloformate. The carbonyl halides which can be employed herein are carbonyl bromide, carbonyl chloride, and mixtures thereof. Typical carbonate esters which may be employed herein are diphenyl carbonate, di-(halophenyl)carbonates such as di(chlorophenyl)carbonate, di(bromophenyl)carbonate, di(trichlorophenyl)carbonate, di(tribromophenyl)carbonate, etc., di(alkylphenyl)carbonates such as di(toyl)carbonate, etc., di(naphthyl)carbonate, di(chloronaphthyl)carbonate, phenyl tolyl carbonate, chlorophenyl chloronaphthyl carbonate, etc., or mixtures thereof. The bishaloformates suitable for use herein include the bishaloformates of dihydric phenols such as bischloroformate of hydroquinone, bischloroformate of bisphenol-A, and the like; or bishaloformates of glycols such as the bischloroformate of ethylene glycol, neopentyl glycol, polyethylene glycol, and the like. While other carbonate precursors will occur to those skilled in the art, carbonyl chloride, also known as phosgene, is the preferred carbonate precursor.

The aromatic polycarbonates useful in the practice of the instant invention may be prepared, by employing a molecular weight regulator, an acid acceptor and a catalyst. The molecular weight regulators which may be employed include the monohydric phenols such as phenol itself, chroman-I, and paratertiarybutyl phenol.

A suitable acid acceptor may be either an organic or an inorganic acid acceptor. A suitable organic acceptor is a tertiary amine and includes such amines as pyridine, triethylamine, dimethylaniline, tributylamine, and the like. The inorganic acid acceptor may be one which can be a hydroxide, a carbonate, or phosphate of an alkali or alkaline earth metal.

The catalysts which are employed in the preparation of the carbonate polymers can be any of the suitable catalysts which aid the polymerization reaction of the dihydric phenols with the carbonate precursors. Suitable catalysts include, but are not limited to tertiary amines such as triethyl amine, tripropyl amine, N,N-dimethylaniline, quaternary ammonium compounds and quaternary phosphonium compounds.

Particularly useful polycarbonates are those containing recurring structural units represented by the general formula

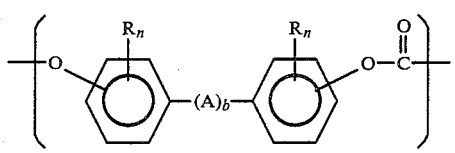

wherein:
R is independently selected from halogen and monovalent hydrocarbon radicals,
A is selected from divalent hydrocarbon radicals,

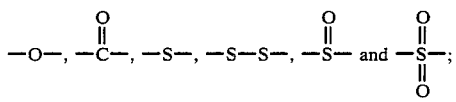

b is either zero or one; and
n is independently selected from positive integers having a value of from 0 to 4 inclusive.

The monovalent hydrocarbon radicals represented by R include alkyl, cycloalkyl, aryl, aralkyl and alkaryl radicals. The divalent hydrocarbon radicals represented by A include alkylene, cycloalkylene, alkylidene and cycloalkylidene radicals.

Also included herein are the branched polycarbonates which are obtained by the reaction of a dihydric phenol, a carbonate precursor, and a polyfunctional aromatic compound to provide a thermoplastic randomly branched carbonate polymer. These polyfunctional aromatic compounds are well known in the art and contain at least three functional groups which may be hydroxyl, carboxyl, carboxylic anhydride, haloformyl, or mixtures thereof. Some illustrative non-limiting examples of these polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like.

Also included herein are blends of linear and branched polycarbonates.

Within the definition of aromatic polycarbonates are also copolyester-carbonates, that is the polymer derived from a dihydric phenol, a carbonate precursor, and an ester precursor such as a difunctional carboxylic acid or an acid halide. These copolyester-carbonates are disclosed in U.S. Pat. No. 3,169,121, which is hereby incorporated herein by reference.

The olefin vinyl alcohol copolymers which comprise the second component of the multicomponent composition of the instant invention are known in the art and are disclosed, inter alia, in U.S. Pat. No. 3,585,177, which is hereby incorporated herein by reference. These olefin vinyl alcohol copolymers may be prepared by hydrolyzing olefin vinyl esters. The olefins used in the preparation of the olefin vinyl alcohols are the lower alpha olefins of from 2 to 4 carbon atoms, e.g., ethylene, propylene, butene-1 and isobutylene. Especially preferred is ethylene.

Suitable vinyl esters which can be copolymerized with the olefin monomers and subsequently hydrolyzed to form the olefin vinyl alcohol copolymers include vinyl ester monomers of the general formula:

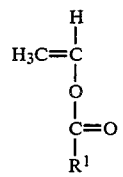

wherein $R^1$ is selected from hydrogen, alkyl radicals of from 1 to about 10 carbon atoms, and aryl radicals of from 6 to 12 carbon atoms. Some illlustrative non-limiting examples of these vinyl esters include vinyl formate, vinyl acetate, vinyl propionate, vinyl butyrate, and vinyl benzoate.

The preferred olefin vinyl alcohol copolymers are ethylene vinyl alcohol copolymers wherein the ethylene content is from 5 to 40 weight percent based on the weight of the copolymer. Especially preferred are ethylene vinyl alcohol copolymers wherein the ethylene content is from 8.9 to 36.7 weight percent. Most especially preferred are ethylene vinyl alcohol copolymers wherein the ethylene content is from 12 to 29.8 weight percent.

The residual ester content of the copolymer should be less than 3% and preferably less than 2% by weight. Most preferably the ester content is less than 1% by weight. The preferred olefin vinyl alcohol copolymers contain less than 2% homopolymers, and preferably less than 1% homopolymers.

The term olefin vinyl alcohol copolymers also includes those copolymers containing a synthetic or natural rubber component such as butadiene, isoprene, natural rubbers, acrylonitrile-butadiene-styrene terpolymers, ethylene-propylene copolymers and terpolymers, chlorinated rubbers, and the like.

The third component of the multicomponent composition of the instant invention is selected from (i) an olefin vinyl ester copolymer, or (ii) a polyolefin.

The polyolefins which comprise the third component of the multicomponent blends of the instant invention are well known in the art and are generally commercially available. Typical of the polyolefins are polyethylene, polypropylene, polybutylene, polyisobutylene or any of the polyolefins derived from olefin monomers having from two to about 8 carbon atoms. Copolymers of the above may be employed and are included within the term polyolefin. Examples of copolymers include copolymers of ethylene and propylene or ethylene and butene. The term copolymers includes the usual copolymers, that is, random, random block, and block copolymers. Various densities of polyolefins can be employed in this invention and include high density polyethylene, linear low density polyethylene and low density polyethylene. The preferred polyolefin is polypropylene.

The olefin vinyl esters which comprise the third component of the multicomponent blends of the instant invention are well known in the art and are generally commercially available.

These esters may generally be prepared by the copolymerization of an olefin and a vinyl ester. The olefins used in the preparation of the olefin vinyl esters are the lower alpha olefins of from 2 to 4 carbon atoms. An especially preferred olefin is ethylene.

The vinyl esters which can be copolymerized with the olefins are the vinyl ester monomers of Formula II. A particularly useful vinyl ester is vinyl acetate.

The preferred olefin vinyl esters of this type are those comprised of ethylene vinyl acetate copolymers. Especially preferred ethylene vinyl acetate copolymers are those wherein the acetate content is from about 15 to about 35 percent based on the weight of the copolymer.

The compositions of the instant invention may optionally contain an impact modifier to improve the impact properties of the compositions. Generally these impact modifiers are quite well known in the art and serve to upgrade the impact properties of polymers such as polycarbonates. Examples of these impact modifiers include, but are not limited to, the following general categories:

polyacrylates;
polyolefins;
rubbery dienic polymers; and
styrenic polymers.

The polyacrylates which may be employed as impact modifiers are rubbery homopolymers or copolymers. In general the polyalkyl acrylates described in Brinkman et al., U.S. Pat. No. 3,591,659, incorporated herein by reference, can be used, especially those containing units derived from alkyl acrylates, particularly n-butyl acrylate. Acrylate containing copolymers wherein the other monomer is, for example, derived from a methacrylate are also readily employable, see for example Japanese Patent Application Announcement 1968-18611, incorporated herein by reference. Preferably the acrylate resin will be in the form of a rubber-elastic graft copolymer having a glass transition temperature below about −20° C., preferably below about −40° C. Schlichting, U.S. Pat. No. 4,022,748, incorporated herein by reference. More preferably, the acrylate resin will comprise a multiple stage polymer having a rubbery first stage (core) and a thermoplastic hard final stage (shell), see Farnham U.S. Pat. No. 4,096,202, incorporated herein by reference.

The most preferred acrylate resin is a multiphase composite interpolymer comprised of a $C_1$-$C_5$ acrylate and a $C_1$-$C_5$ methacrylate. These interpolymers consist of about 25 to 95 weight percent of a first elastomeric phase polymerized from a monomer system comprising about 75 to 99.8 weight percent of a $C_1$-$C_5$ alkyl acrylate, 0.1 to 5 weight percent of cross linking monomer, 0.1 to 5 weight percent by weight of graftlinking monomer, and about 75 to 5 weight percent of a final rigid thermoplastic phase polymerized in the presence of said elastomeric phase.

The crosslinking monomer is a polyethylenically unsaturated monomer having a plurality of addition polymerizable reactive groups all of which polymerize at substantially the same rate of reaction. Suitable crosslinking monomers include polyacrylic and polymethacrylic esters of polyols such as butylene diacrylate and dimethacrylate, trimethylol propane trimethacrylate, and the like; di and trivinyl benzene, vinyl acrylate and methacrylate, and the like. The preferred crosslinking monomer is butylene diacrylate.

The graftlinking monomer is a polyethylenically unsaturated monomer having a plurality of additional polymerizable reactive groups, at least one of which polymerizes at substantially different rates of polymerization from at least one other of said reactive groups. The function of the graftlinking monomer is to provide a residual level of unsaturation in the elastomeric phase, particularly in the latter stages of polymerization and, consequently, at or near the surface of the elastomer particles.

When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to the surface of the elastomer. Among the effective graftlinking monomers are alkyl group containing monomers of alkyl esters of ethylenically unsaturated acids such as allyl acrylate, allyl methacrylate, diallyl maleate, diallyl fumerate, and allyl acid itaconate. Somewhat less preferred are the diallyl esters of polycarboxylic acids which do not contain polymerizable unsaturation. The preferred graftlinking monomers are allyl methacrylate and diallyl maleate.

A most preferred interpolymer has only two stages, a first stage comprising about 60 to 95 percent by weight to the interpolymer and being polymerized from a monomer system comprising 95 to 99.8 percent by weight butyl acrylate, 0.1 to 2.5 percent by weight butylene diacrylate as crosslinking agent, 0.1 to 2.5 percent by weight allyl methacrylate or diallyl maleate as a graftlinking agent, with a final stage polymerized from about 60 to 100 percent by weight methyl methacrylate. The multiphase composite interpolymer Acryloid KM-330 available from Rohm and Haas is preferred. This interpolymer is comprised of small quantities of crosslinking and graft monomers, about 80 weight percent n-butyl acrylate and about 20 weight percent methyl methacrylate.

The polyolefins which can be employed as impact modifiers, particularly in the case where component (iii) is an olefin vinyl ester copolymer, are homopolymers or copolymers. Examples of homopolymers include polyethylene, polypropylene, polybutene-1, polyhexene and the like. The polymers include the standard high density polymers, low density polymers as well as the new linear low density polyolefins such as the linear low density polyethylene made with butene-1 or octene-1. Other examples of copolymers containing at least one olefin monomer can be employed. For example, copolymers of ethylene and propylene can be employed as the impact modifier as well as a copolymer of an olefin and an acrylate such as ethylene ethyl acrylate, a copolymer available from Union Carbide as DPD-6169. Other higher olefin monomers can be employed as copolymers with alkyl acrylates, for example propylene and n-butyl acrylate and the like. These polyolefin polymers can also be reacted with rubbery dienes so as to form terpolymers of the EPDM family such as ethylene propylene diene terpolymers, for example Epsyn 704 available from Copolymer Rubber.

Various rubbery polymers can also be employed as impact modifiers. Examples of such rubbery polymers include polybutadiene, polyisoprene, styrene-butadiene and various other copolymers having a rubbery dienec comonomer.

Styrene containing polymers also can be employed as impact modifiers. Examples of such polymers include acrylonitrile-butadiene-styrene, styrene acrylonitrile, acrylonitrile-butadiene-alpha-methylstyrene, methacrylate-butadiene-styrene and other high impact styrene containing polymers.

Other known impact modifiers include various elastomeric materials such as organic silicone rubbers, organic silicone polysiloxane polymers, polysiloxane-polycarbonate block copolymers, elastomeric fluorohydrocarbons, elastomeric polyesters, and the like.

Generally any minimum quantity of impact modifier which positively upgrades the impact strength of the compositions of the instant invention can be employed. Greater than this minimum quantity may be employed so long as the properties desired for a particular application of these compositions are substantially maintained. Generally a minimum of about two weight percent is sufficient to observe an increase in the impact strength. A minimum of about four weight percent is preferred. A level of about 30 weight percent should generally not be exceeded, preferably about 20 weight percent. Weight percent is measured as the amount of impact modifier in the total of impact modifier plus the components (i)–(iii) of the instant compositions.

The compositions of the instant invention may also optionally contain organic or inorganic inert fillers. The fillers which may be used are preferably particulate fillers such as particulate glass, e.g., chopped glass fiber, glass rovings, glass microbaloons or microspheres, and pulverulent glass, clay, talc, mica, inorganic natural fibers, synthetic organic fibers, alumina, graphite, silica, calcium carbonate, carbon black, magnesia, and the like. Generally such fillers are added to reinforce the structural integrity of the composition, e.g., to inhibit sagging and/or improve the tensile strength and stiffness of the composition and also to reduce shrinkage, minimize crazing, and lower material costs. Generally the amount of filler employed in the compositions of the instant invention is in the range of from about 2 to about 60 weight percent, preferably from about 5 to about 50 weight percent, and especially from about 8 to about 30 weight percent based on the combined weight of the components (i)–(iii) and the filler.

The compositions of the instant invention may also optionally contain other commonly known and used additives such as ultraviolet radiation absorbers such as the benzophenones, benzotriozoles, cyanoacrylates, and the like; hydrolytic stabilizers such as the epoxides disclosed in U.S. Pat. Nos. 3,489,716, 4,138,379 and 3,839,247, all of which are incorporated herein by reference; color stabilizers such as the organophosphites disclosed in U.S. Pat. Nos. 3,305,520 and 4,118,370, both of which are incorporated herein by reference; and flame retardants.

Some particularly useful flame retardants are the alkali and alkaline earth metal salts of organic sulfonic acids. These types of flame retardants are disclosed, inter alia, in U.S. Pat. Nos. 3,933,734, 3,948,851, 3,926,908, 3,919,167, 3,909,490, 3,953,396, 3,931,100, 3,978,024, 3,953,399, 3,917,559, 3,951,910 and 3,940,366, all of which are incorporated herein by reference. When the instant compositions contain flame retardants, the amount of flame retardant present is a flame retardant amount. By flame retardant amount is meant an amount effective to render said compositions flame retardant. Generally, this amount is in the range of from about 0.01 to about 10 weight percent, based on the amounts of flame retardant additive and components (i)–(iii) present in the compositions.

PREFERRED EMBODIMENT OF THE INVENTION

The following examples are presented to more fully and clearly illustrate the invention. The Examples are intended and should be considered as illustrative rather than limiting the invention. In the examples, unless otherwise indicated, all parts and percentages are on a weight basis.

The following examples illustrate the blends of the instant invention.

EXAMPLE 1

A mixture comprised of 15 parts by weight of ethylene vinyl alcohol copolymer (EVAL-F), 47.5 parts by weight of a polycarbonate derived from bisphenol-A and phosgene, and 37.5 parts by weight of polypropylene is prepared by tumble blending the ingredients together on a tumble blender for 5 minutes. This mixture is then dried at 100° C. for about 4 hours. The mixture is then extruded on a 1.5 inch single screw extruder at 450°/460°/470°/480° F. (extruder profile from feed throat to die—with the die set at 475° F.). The extrudate is chopped into pellets and the pellets are injection molded on a 3 ounce Newbury at 460°/470°/480° F. into standard test bars.

These test bars are subjected to a variety of tests to determine their mechanical properties. These tests include ASTM, Heat Distortion Under Load (DTUL); Flexural Strength and Flexural Modulus, ASTM D790; Notched Izod Impact Strength (NI), ASTM D256; and Gardner Impact Strength. The results of these tests are set forth in Table I.

EXAMPLE 2

The procedure of Example 1 is substantially repeated except that the mixture contains 6.5 parts by weight of the ethylene vinyl alcohol copolymer, 52 parts by weight of the polycarbonate, and 41.5 parts by weight of the polypropylene.

EXAMPLE 3

The procedure of Example 1 is substantially repeated except that the mixture contains 5 parts by weight of the ethylene vinyl alcohol copolymer, 10 parts by weight of the polycarbonate, and 85 parts by weight of the polypropylene.

Additionally, the tensile properties, such as % elongation and Yield Strength of the test bars were determined. The test bars of Examples 1-3 had a % elongation of 6%, 8% and 23%, respectively. These test bars had a Yield Strength (psi×10³) of 4.60, 5.23 and 2.64, respectively.

TABLE I

| Example No. | Notched Izod ((0.125″) ft. lb./in. | Gardner Impact in. lbs. | DTUL °C. at 264 psi | Flexural Properties modulus (psi × 10⁵) | strength (psi × 10³) |
|---|---|---|---|---|---|
| 1 | 0.4 | <8 | 90 | 2.81 | 6.52 |
| 2 | 1.2 | <8 | 94 | 2.79 | 5.22 |
| 3 | 0.2 | <8 | 62 | 2.1 | 4.93 |

Obviously, other modifications and variations of the present invention are possible. It is, therefore, to be understood that changes may be made in the particular embodiments of the invention as described herein which are within the full intended scope of the invention as defined by the appended claims.

What is claimed is:

1. Polycarbonate composition comprising, in physical admixture:
   (i) from about 10 to about 96 weight percent of at least one high molecular weight aromatic thermoplastic polycarbonate resin;
   (ii) from about 2 to about 35 weight percent of at least one olefin vinyl alcohol copolymer; and
   (iii) at least one material selected from
      (a) about 2 to about 35 weight percent of olefin vinyl ester copolymer comprising the polymerized reaction products of at least one lower alpha olefin containing from 2 to 4 carbon atoms and at least one ester monomer represented by the formula

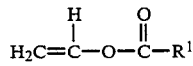

wherein R¹ is selected from hydrogen, alkyl radicals, or aryl radicals; or
      (b) about 2 to about 90 weight percent of polyolefin derived from at least one hydrocarbon olefin monomer containing from 2 to about 8 carbons.

2. The composition of claim 1 wherein said olefin vinyl ester copolymer (iii) (a) is ethylene vinyl acetate copolymer.

3. The composition of claim 1 wherein said polyolefin (iii) (a) is polypropylene.

4. The composition of claim 1 wherein said polycarbonate is bisphenol-A polycarbonate.

5. The composition of claim 1 wherein said olefin vinyl alcohol (ii) is ethylene vinyl alcohol copolymer.

6. The composition of claim 5 wherein said polycarbonate is bisphenol-A polycarbonate.

7. The composition of claim 6 wherein (iii) is (a).

8. The composition of claim 6 wherein (iii) is (b).

9. The composition of claim 7 wherein (iii) (a) is ethylene vinyl acetate copolymer.

10. The composition of claim 8 wherein (iii) (b) is polypropylene.

11. The composition of claim 1 which contains from about 15 to about 90 weight percent (i), from about 3 to about 30 weight percent (ii), and from about 3 to about 30 weight percent (iii) (a).

12. The composition of claim 11 which contains from about 20 to about 85 weight percent (i), from about 5 to about 25 weight percent (ii), and from about 5 to about 25 weight percent (iii) (a).

13. The composition of claim 1 which contains from about 15 to about 90 weight percent (i), from about 3 to about 30 weight percent (ii), and from about 5 to about 85 weight percent (iii) (b).

14. The composition of claim 13 which contains from about 20 to about 85 weight percent (i), from about 5 to about 25 weight percent (ii), and from about 15 to about 85 weight percent (iii) (b).

15. The composition of claim 5 wherein said olefin vinyl ester copolymer has an ester content of from about 15 to about 35 weight percent.

16. The composition of claim 1 wherein said olefin vinyl alcohol copolymer is comprised of the polymerized and hydrolyzed reaction products of at least one alpha olefin containing from 2 to 4 carbon atoms and at least one ester monomer represented by the formula

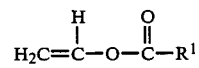

wherein R¹ is selected from hydrogen, alkyl radicals or aryl radicals.

17. The composition of claim 1 wherein the olefin content of said olefin vinyl alcohol copolymer is from 5 to about 40 weight percent.

18. The composition of claim 1 which contains an impact modifying amount of at least one impact modifier.

19. The composition of claim 1 which contains a flame retardant amount of at least one flame retardant compound.

20. The composition of claim 19 wherein said flame retardant compound is selected from the alkali and alkaline earth metal salts of organic sulfonic acids.

21. The composition of claim 1 which contains an inert filler.

* * * * *

UNITED STATES PATENT AND TRADEMARK OFFICE
CERTIFICATE OF CORRECTION

PATENT NO. : 4,587,295

DATED : May 6, 1986

INVENTOR(S) : Harold F. Giles, and Robert P. Hirt

It is certified that error appears in the above-identified patent and that said Letters Patent is hereby corrected as shown below:

Column 9, line 54,     -     "(iii) (a) is polypropylene."

should be     -     "(iii) (b) is polypropylene."

Signed and Sealed this

Twenty-third Day of February, 1988

*Attest:*

DONALD J. QUIGG

*Attesting Officer*     *Commissioner of Patents and Trademarks*